United States Patent [19]

Takada et al.

[11] Patent Number: 5,675,806

[45] Date of Patent: Oct. 7, 1997

[54] PROGRAM LINKAGE METHOD FOR USING DUMMY ARGUMENTS TO LINK PROGRAM HAVING HIERARCHICAL STRUCTURE

[75] Inventors: Toshikazu Takada; Yuji Mochizuki, both of Tokyo, Japan

[73] Assignee: NEC Corporation, Tokyo, Japan

[21] Appl. No.: 557,555

[22] Filed: Nov. 14, 1995

[30] Foreign Application Priority Data

Nov. 14, 1994 [JP] Japan .................................. 6-278831

[51] Int. Cl.⁶ .................................................. G06F 9/44
[52] U.S. Cl. ......................... 395/710; 395/680; 395/685
[58] Field of Search .................................. 395/710, 680, 395/685

[56] References Cited

U.S. PATENT DOCUMENTS 5,062,039 10/1991 Brown et al. ........................... 364/200
5,386,568 1/1995 Wold et al. ............................. 395/700
5,437,034 7/1995 Tanaka et al. .......................... 395/700
5,504,901 4/1996 Peterson ................................. 395/700

OTHER PUBLICATIONS

"Compilers: Principles, Techniques, and Tools", Aho et al., Addison–Wesley Publishing Company, 1988, pp. 424–429.

*Primary Examiner*—Kevin A. Kriess
*Assistant Examiner*—Kakali Chaki
*Attorney, Agent, or Firm*—Foley & Lardner

[57] ABSTRACT

A program linkage method comprising a step for allocating an array work area used by a low-order subprogram and an area for a table used to manage said array work area in a one-dimensional array developed for the main program of a program having hierarchical structure, a step for cataloging information used to identify said array work area to said table, and a step for retrieving information cataloged in said table for identifying said array work area used by said low-order subprogram and for passing said information as a dummy argument to said low-order subprogram.

9 Claims, 4 Drawing Sheets

FIG. 3

```
c
            parameter n = 1000
            dimension a(n)
c
            call memtbl( a, n, 3 )              ← (1)
            call getmem( 'x', 100 )
            call getmem( 'y', 200 )             ← (2)
            call getmem( 'z', 300 )
c
            call getadd( a, n, 'x', i1, nx )    ← (3)
c
            call sub1( a, n, a(i1), nx )
c
            stop
            end
c
            subroutine sub1( a, n, x, nx )
            dimension x(nx)
c
            do 10 ix = 1, nx
                x( ix ) = 10 * ix
    10 continue
c
            call getadd( a, n, 'y', i2, ny )    ← (3)
            call sub2( a, n, x, a(i2), nx, ny )
c
            return
            end
c
            subroutine sub2( a, n, x, y, nx, ny )
            dimension x(nx), y(ny)
c
            do 10 iy = 1, ny
                y( iy ) = 10 * x( ( iy - 1 ) / 2 + 1 )
    10 continue
c
            call getadd( a, n, 'z', i3, nz )    ← (3)
            call sub3( y, a(i3), ny, nz )
c
            return
            end
c
            subroutine sub3( y, z, ny, nz )
            dimension y(ny), z(nz)
c
            do 10 iz = 1, nz
                z( iz ) = 10 * y( ( iz - 1 ) / 3 + 1 )
    10 continue
c
            return
            end
```

FIG. 4
(PRIOR ART)

```fortran
c
      parameter n = 1000
      dimension a(n)
c
c
      i1  =        1
      i2  = i1 + 100
      i3  = i2 + 200
c
c
c
      call sub1( a(i1), a(i2), a(i3), 100, 200, 300 )
c
      stop
      end
c
      subroutine sub1( x, y, z, nx, ny, nz )
      dimension x(nx), y(ny), z(nz)
c
      do 10 ix = 1, nx
         x( ix ) = 10 * ix
 10   continue
c
c
      call sub2( x, y, z, nx, ny, nz )
c
      return
      end
c
      subroutine sub2( x, y, z, nx, ny, nz )
      dimension x(nx), y(ny), z(nz)
c
      do 10 iy = 1, ny
         y( iy ) = 10 * x( ( iy -1 ) / 2 + 1 )
 10   continue
c
c
      call sub3( y, z, ny, nz )
c
      return
      end
c
      subroutine sub3( y, z, ny, nz )
      dimension y(ny), z(nz)
c
      do 10 iz = 1, nz
         z( iz ) = 10 * y( ( iz -1 ) / 3 + 1 )
 10   continue
c
      return
      end
```

PROGRAM LINKAGE METHOD FOR USING DUMMY ARGUMENTS TO LINK PROGRAM HAVING HIERARCHICAL STRUCTURE

BACKGROUND OF THE INVENTION

1. Field of the Invention

The present invention relates to a program linkage method for linking application programs with hierarchical structure created by such high-level languages as FORTRAN and C. It relates particularly to a program linkage method for linking programs by passing divided one-dimensional arrays developed for a main program to low-order subprograms as dummy arguments.

2. Description of the Related Art

The use of such high-level languages as FORTRAN and C for creating a highly versatile program with hierarchical structure consisting of a main program and subprograms requires management of arrays and other elements. Typically, the management is such that appropriately divided one-dimensional arrays developed for the main program are passed to low-order subprograms as dummy arguments to be used as adjustable arrays.

Such method is used mainly for the following reasons. First, locally covering arrays by subprograms requires that array declaration be changed according to an increase in computation scale. Thus, larger program size results in more correction jobs and in higher risk of bag inclusion. Second, because fixed array area size is specified by a subprogram, array size needed for actual computation may conflict with the specified array size, frequently causing access outside the array area. The fact that many errors during program execution occur because of access outside the array area tells that it is undesirable for a subprogram to cover arrays.

FIG. 4 illustrates a brief example of the past program in which divided one-dimensional arrays for a main program are used as adjustable arrays.

Once a load module has been created by this programming technology, the same program can be used for computation of size within the array area developed for the main program. Therefore, programs can be managed efficiently. Furthermore, size of all needed work areas and array size reserved in the main program can be checked before computation to prevent access outside the array area. Even for computation beyond an array area for the main program, requirements can be satisfied by compiling and re-linking only the main program under different-size one-dimensional arrays. Hence, the load module can be updated very easily.

As described above, although the prior art provides excellent program linkage technologies, many array areas are needed for a large-size program and a subprogram calling sequence is complicated. In other words, very troublesome coding is required.

These problems result from the requirement in the prior art that all array areas used by low-order subprograms be passed as dummy arguments. For a subprogram with hierarchical structure, therefore, array areas for low-order subprograms must be passed even to middle-order subprograms as well as dummy arguments. This results in a large number of dummy arguments needed for these subprograms. Thus, dummy arguments are often disordered, or invalid characters are frequently typed, and it takes much time to debug programs.

Creation of a program by FORTRAN is curbed by the restriction that the allowable maximum number of continuation lines is 19. Hence, array areas beyond this limit cannot be passed as dummy arguments. The use of many arguments is accompanied by the disadvantage that subprograms must be divided further.

A more serious problem arises when new algorithm is used to rewrite part of a program. Typically, the subprogram used to execute target computation is located at the bottom. This means that changing array areas for the subprogram in the prior art must affect dummy arguments in all subprograms in the middle stages. Thus, unnecessary dummy arguments must be deleted, and new needed dummy arguments must be added to the existing ones. The deletion and addition may result in dislocation of dummy arguments and occurrence of new bugs. Debugging by more than one programmer is confronted with the problem of troublesome inefficient arrangement of dummy arguments. Establishment of a program linkage method that can settle the problem will lead to more efficient program development, as well as to functional enhancement and easier maintenance.

SUMMARY OF THE INVENTION

It is the objective of the present invention to provide a program linkage method that can solve problems in the past program linkage process, make program development more efficient, enhance functions and make maintenance easier.

According to one aspect of the invention, a program linkage method comprising the steps of:

a step for allocating an array work area used by a low-order subprogram and an area for a table used to manage said array work area in a one-dimensional array developed for the main program of a program having hierarchical structure;

a step for cataloging information used to identify said array work area to said table; and a step for retrieving information cataloged in said table for identifying said array work area used by said low-order subprogram and for passing said information as a dummy argument to said low-order subprogram.

In the preferred construction, the information used to identify said array work area to be cataloged to said table includes at least the relative address of said array work area in said one-dimensional array.

In the preferred construction, the step for cataloging information to said table comprises a substep in which a high-order main program or subprogram catalogs the variable names and types of variables in said array work area to be used, and the size of said array work area immediately before calling a subprogram using said array work area, and determines the relative address of the start position of said array work area in said one-dimensional array and catalogs said relative address under an array name.

In the preferred construction, the step for cataloging information to said table comprises:

a substep for judging whether to first use said array work area in said one-dimensional array; and a substep in which a high-order main program or subprogram catalogs the variable names and types of variables in said array work area, and the size of said array work area immediately before calling a subprogram using said array work area when said array work area is used first, and determines the relative address of the start position of said array work area in said one-dimensional array and catalogs said relative address under an array name.

In the above-mentioned construction, the program linkage method further comprises:

a step in which a subprogram using said array work area identifies said array work area according to a received dummy argument for computation; and a step for clearing said used array work area after said computation by said subprogram when said used array work area is not used by another subprogram, and for reusing said opened one-dimensional array area as an array work area for other variables as needed.

In the above-mentioned construction, the program linkage method further comprises:

a step in which a subprogram using said array work area identifies said array work area according to a received dummy argument for computation;

a step for clearing said used array work area after computation by said subprogram when said used array work area is not used by another subprogram; and a step for condensation where the other array work areas positioned after a cleared one-dimensional array area are embedded in said cleared one-dimensional array area after the array work area not used has been cleared.

According to another aspect of the invention, a program linkage method comprising:

a step for allocating an array work area used by a low-order subprogram and an area for a table used to manage said array work area in a one-dimensional array developed for the main program of a program having hierarchical structure;

a step for judging whether to first use said array work area for a certain subprogram;

a step in which a high-order main program or subprogram catalogs the variable names and types of variables in said array work area to be used, and the size of said array work area immediately before calling a subprogram using said array work area when said array work area is used first, and determines the relative address of the start position of said array work area in said one-dimensional array and catalogs said relative address under an array name;

a step for retrieving the relative address and size of the start position of said array work area according to said array name of said array work area if said array work area to be used has already been used by another subprogram; and a step for passing the relative address and size of the start position of said array work area cataloged in said table, or the relative address and size of the start position of said array work area retrieved from said table as a dummy argument to a low-order program using said array work area.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 illustrates typical program coding in the preferred embodiment.

FIG. 4 illustrates an example of program coding by the program linkage method based on the prior art.

DESCRIPTION OF THE PREFERRED EMBODIMENT

Figure 1:
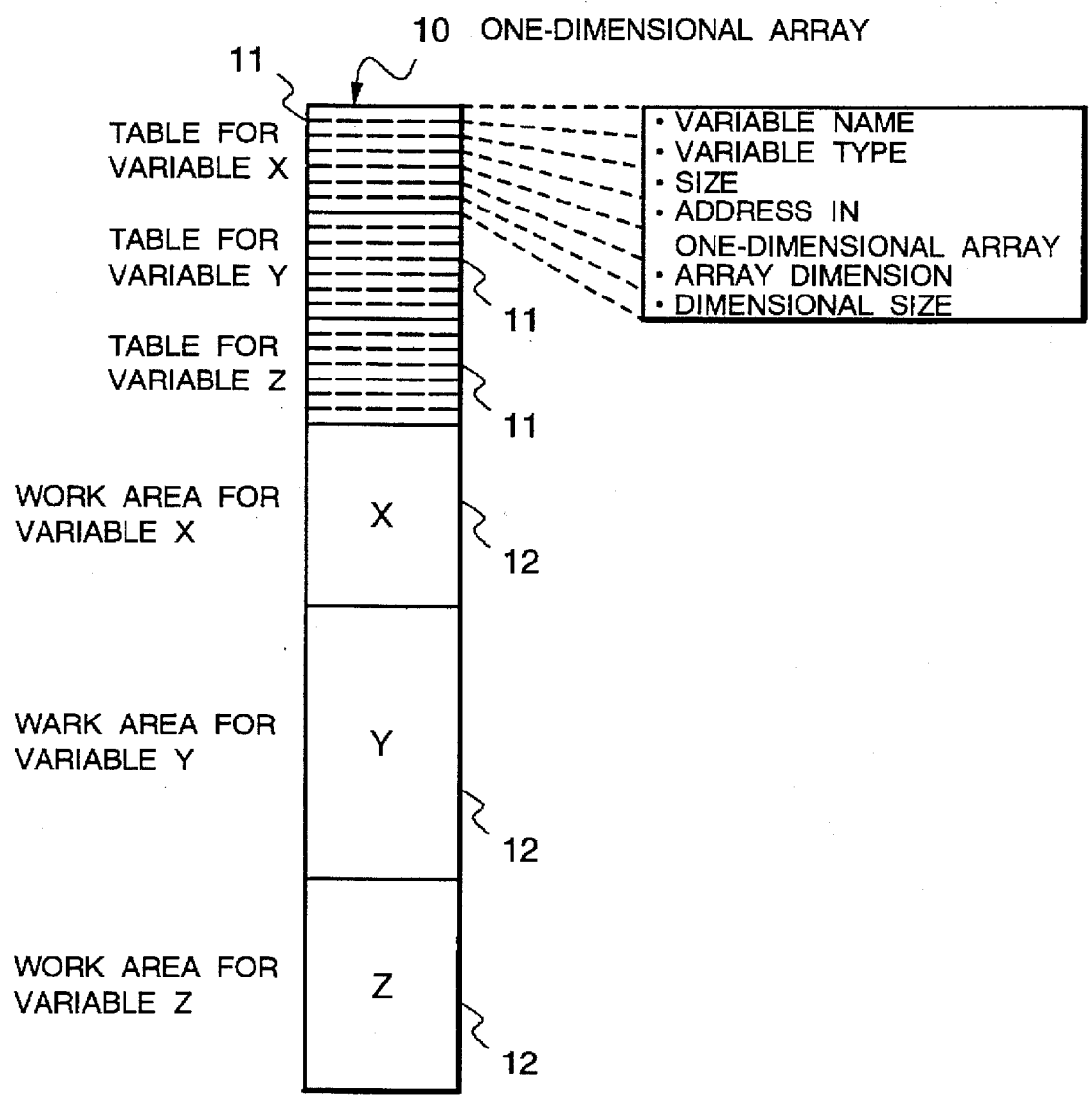
FIG. 1 illustrates a preferred embodiment of the present invention in which an example one-dimensional array is used to link programs.

The preferred embodiment of the present invention is explained below in detail by referring to the drawings.

FIG. 1 illustrates a preferred embodiment of the present invention in which an example one-dimensional array is used to link programs.

As shown in FIG. 1, a program used in the preferred embodiment comprises a table 11 set at the top of a one-dimensional array 10 and an array work area 12 formed by dividing the one-dimensional array 10. In the preferred embodiment, three variables of x, y and z are used. As shown in FIG. 1, the tables 11 corresponding to the variables are set at the top of a work area allocated for a main program.

As shown in FIG. 1, the table 11 covers the variable names and types of variables, and addresses of an array work area 12 for the variables on the one-dimensional array 10. Addresses of the array work area 12 on the one-dimensional array 10 are relative addresses in the array work area 12 corresponding to an array work area 12 for other variables. In other words, an address provides information on the position from the top of the one-dimensional array 10. In the preferred embodiment of FIG. 1, array dimensions and dimensional size are also cataloged in the table. But, dimensional information is merely convenient to coding and, thus, is not an indispensable element in the preferred embodiment.

The preferred embodiment is characterized by the table 11 with the above configuration located in the one-dimensional array 10 for a main program. The relative position as a dummy argument of the array work area 12 cataloged in the table 11 is passed to a low-order subprogram that uses the array work area 12. As described below, this feature eliminates the need for passing the array work area 12 to a middle-order subprogram as a dummy argument, enabling simple coding.

Figure 2:
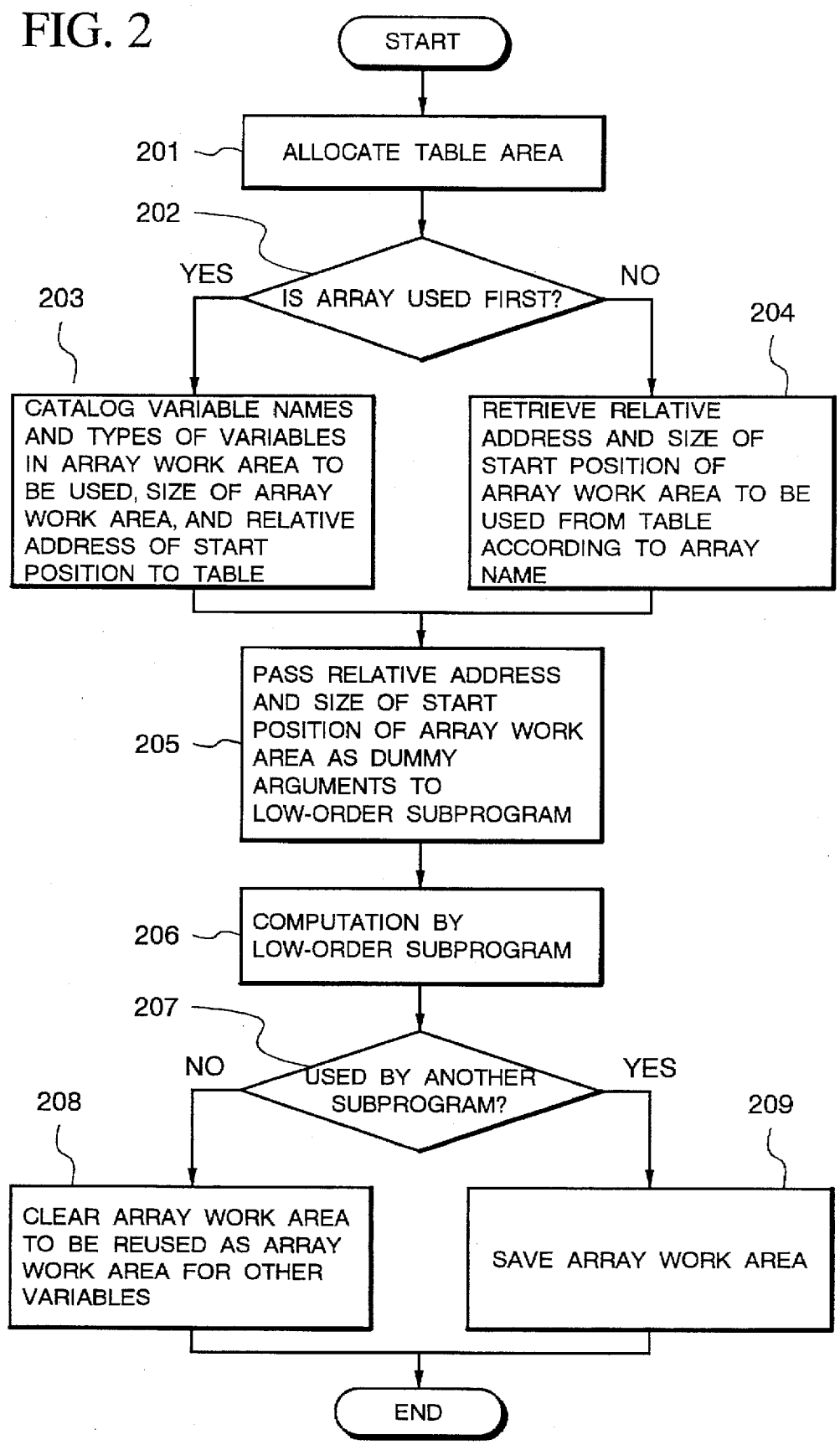
FIG. 2 provides a flow chart that shows the operation of the program linkage method based on the preferred embodiment of the present invention.

FIG. 2 provides a flow chart that shows the operation of the program linkage method based on the preferred embodiment of the present invention.

First of all, an area for storing the table 11 for all array variables to be used is allocated in a work area for the one-dimensional array 10 developed for a main program (Step 201).

Next, when an array variable is first looked into, the variable name and type of the variable, and the size of the array work area 12 are cataloged to the table 11. The relative address of the array work area 12 for the variable in the one-dimensional array 10 is determined and cataloged to the table 11 under an array name (Steps 202 and 203). The relative address cataloged in the table 11 is used to specify the position of the array work area 12 in the one-dimensional array 10, with the relative address as a dummy argument passed to a low-order subprogram (Step 205).

When the array work area 12 created by another subprogram is looked into instead of an array variable, the size and relative address of the array work area 12 is retrieved from the table 11 according to the array name (Steps 202 and 204). An array address is specified using the retrieved relative address, and passed to a low-order subprogram as a dummy argument (Step 205).

After completion of the target application by these arrays (step 206), the array work area 12 is checked to see if it is used by another subprogram. If the area is not used, the high-order main program or subprogram clears the relative address of the array work area to reuse the opened array area as another array work area 12 (Steps 207 and 208). Such use often results in the disorder of the one-dimensional array, making it impossible to allocate the large work area 12. Figuring out this problem requires that the gap be reduced by a so called condensation instruction. In the preferred embodiment, transfer in cores serves condensation, which is completed in a very small period. Therefore, relatively frequent condensation causes no problem.

To the contrary, the saved relative address of the array work area 12 can be used as is by another subprogram (Steps 207 and 209).

FIG. 3 shows typical program coding based on the program linkage method of the preferred embodiment. The contents of the program covered in FIG. 3 are the same as those of the program used to explain the program linkage method of the prior art.

In this example, three variables of x, y and z are used, with the size of the array work area 12 for variable x declared as 100, the size of the array work area 12 for variable y as 200, and the size of the array work area 12 for variable z as 300. Calling "memtbl" in (1) allows creation of the table 11 for three variables explained in FIG. 1 in the one-dimensional array area 10 developed for the main program.

Next, specifying a variable name and size by "getmem" in (2) leads to allocation of the array work area 12 for the specified array in the area following the table 11 for the one-dimensional array 10. Moreover, the relative address of the array work area 12 in the one-dimensional array 10 is determined and cataloged to the table 11. In the example of FIG. 3, the three variables are declared by the main program. Essentially, however, "getmem" can be called by the high-order program for the subprogram which uses the variable regardless of the main program and subprogram. Because the number of arrays is changed constantly during program creation, an array area beyond the capacity of the allocated table 11 may have to be allocated. But, an error of insufficient table capacity can be prevented by using "getmem" for comparison with the number of arrays specified in "memtbl". If an array area beyond table capacity has been requested to be allocated, a more number of arrays are specified by "memtbl" to carry on program development.

Once information on array variables has been cataloged to the table 11, the address, size, type and other data of an array variable can be identified easily by specifying the array name to retrieve the table 11. Hence, the relative address of an array variable can be detected by "getadd" in (3) and passed to a low-order subprogram as a dummy argument. That the relative positions of array variables in the one-dimensional array 10 can be detected automatically by calling "getadd" is important. As obvious from FIGS. 3 and 4, therefore, the array work area 12 for variable z required only for lowest-order subprogram sub3 need not be passed as a dummy argument to middle-order programs sub1 and sub2. In the preferred embodiment, calling "getadd" immediately before sub3 allows identification of the relative position i3 of the array work area 12 for variable z to be passed validly to sub3.

As described above, program linkage of the present invention is characterized by a table for managing an array work area used for low-order subprograms. The table is located in a one-dimensional work area developed for a main program. A relative address cataloged in the table is passed to the low-order subprogram as a dummy argument. Thus, passing the dummy argument containing the relative address of the array work area only to the subprogram which actually uses the area enables the subprogram to use the area. As the middle-order subprogram need not use the array as a dummy argument, such bugs as dummy argument dislocation and typing errors can be suppressed maximally.

Hence, the time taken to eliminate such bugs can be reduced.

In addition, the present invention, which does not pass dummy arguments to middle-order subprograms, allows a reduction in the total number of dummy arguments. Creation of a program with FORTRAN is curbed by the restriction that the allowable maximum number of continuation lines is 19. A reduction in the number of dummy arguments leads to prevention of unnecessary subprogram division and, thus, to more convenient development of a large-scale program with complicated hierarchical structure.

Furthermore, correcting only dummy arguments for the subprogram used for actual computation (typically, the lowest-order subprogram) enables the use of new algorithm for rewriting part of a program. Thus, the program can be corrected in a less period, contributing to more convenient program development.

When a program is debugged by two or more programmers, each programmer can declare his (her) own array work area in his (her) own program. Moreover, when data created in another subprogram is used, addresses can be identified easily from the table under common variable names and, thus, the contents can be looked into. Therefore, a program can be debugged more efficiently by more than one programmer, leading to simplification of such jobs related to revision as program enhancement. In addition, highly versatile programs can be maintained easier.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A program linkage method comprising the steps of:
   a step for allocating an array work area used by a low-order subprogram and an area for a table used to manage said array work area in a one-dimensional array developed for the main program of a program having hierarchical structure;
   a step for cataloging information used to identify said array work area to said table; and
   a step for retrieving information cataloged in said table for identifying said array work area used by said low-order subprogram and for passing said information as a dummy argument to said low-order subprogram.

2. A program linkage method as set forth in claim 1, said information used to identify said array work area to be cataloged to said table includes at least the relative address of said array work area in said one-dimensional array.

3. A program linkage method as set forth in claim 1, said step for cataloging information to said table comprises a substep in which a high-order main program or subprogram catalogs the variable names and types of variables in said array work area to be used, and the size of said array work area immediately before calling a subprogram using said array work area, and determines the relative address of the start position of said array work area in said one-dimensional array and catalogs said relative address under an array name.

4. A program linkage method as set forth in claim 1, said step for cataloging information to said table comprises:

a substep for judging whether to first use said array work area in said one-dimensional array; and a substep in which a high-order main program or subprogram catalogs the variable names and types of variables in said array work area, and the size of said array work area immediately before calling a subprogram using said array work area when said array work area is used first, and determines the relative address of the start position of said array work area in said one-dimensional array and catalogs said relative address under an array name.

5. A program linkage method as set forth in claim 1, further comprising:

a step in which a subprogram using said array work area identifies said array work area according to a received dummy argument for computation; and a step for clearing said used array work area after said computation by said subprogram when said used array work area is not used by another subprogram, and for reusing said opened one-dimensional array area as an array work area for other variables as needed.

6. A program linkage method as set forth in claim 1, further comprising:

a step in which a subprogram using said array work area identifies said array work area according to a received dummy argument for computation;

a step for clearing said used array work area after computation by said subprogram when said used array work area is not used by another subprogram; and a step for condensation where the other array work areas positioned after a cleared one-dimensional array area are embedded in said cleared one-dimensional array area after the array work area not used has been cleared.

7. A program linkage method comprising the step of:

a step for allocating an array work area used by a low-order subprogram and an area for a table used to manage said array work area in a one-dimensional array developed for the main program of a program having hierarchical structure;

a step for judging whether to first use said array work area for a certain subprogram;

a step in which a high-order main program or subprogram catalogs the variable names and types of variables in said array work area to be used, and the size of said array work area immediately before calling a subprogram using said array work area when said array work area is used first, and determines the relative address of the start position of said array work area in said one-dimensional array and catalogs said relative address under an array name;

a step for retrieving the relative address and size of the start position of said array work area according to said array name of said array work area if said array work area to be used has already been used by another subprogram; and a step for passing the relative address and size of the start position of said array work area cataloged in said table, or the relative address and size of the start position of said array work area retrieved from said table as a dummy argument to a low-order program using said array work area.

8. A program linkage method as set forth in claim 7, further comprising:

a step in which a subprogram using said array work area identifies said array work area according to a received dummy argument for computation; and a step for clearing said used array work area after computation by said subprogram when said used array work area is not used by another subprogram, and for reusing said opened one-dimensional array area as an array work area for other variables as needed.

9. A program linkage method as set forth in claim 7, further comprising:

a step in which a subprogram using said array work area identifies said array work area according to a received dummy argument for computation;

a step for clearing said used array work area after computation by said subprogram when said used array work area is not used by another subprogram; and a step for condensation where the other array work areas positioned after a cleared one-dimensional array area are embedded in said cleared one-dimensional array area after said array work area not used has been cleared.

* * * * *